Figure 1:
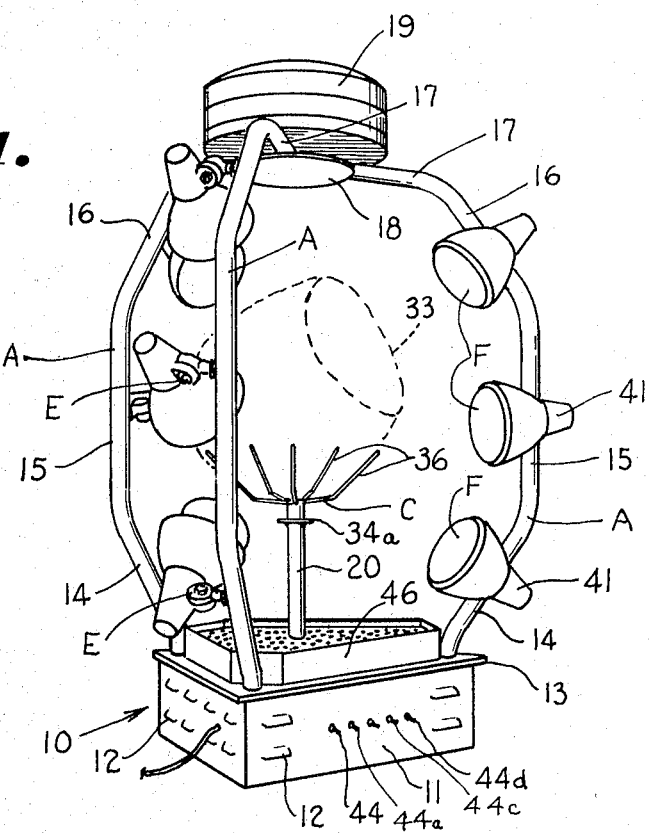

Sept. 5, 1967 R. G. WILSON 3,339,477
DISPLAY COOKING APPARATUS
Filed March 7, 1966 2 Sheets-Sheet 1

INVENTOR.
ROBERT G. WILSON
BY Bailey & Dority
ATTORNEYS

Sept. 5, 1967    R. G. WILSON    3,339,477
DISPLAY COOKING APPARATUS
Filed March 7, 1966    2 Sheets-Sheet 2

INVENTOR.
ROBERT G. WILSON
BY
ATTORNEYS

United States Patent Office 3,339,477
Patented Sept. 5, 1967

3,339,477
DISPLAY COOKING APPARATUS
Robert G. Wilson, 643 E. Faris Road,
Greenville, S.C. 29605
Filed Mar. 7, 1966, Ser. No. 532,327
3 Claims. (Cl. 99—341)

This invention relates to a display cooker, and more particularly to a cooker which displays meat while it is being cooked and permits the meat to be served directly therefrom.

In the sale of meat, such as a roast in a cafeteria and the like, it is extremely advantageous for the customer to be able to observe and smell the aromas from the meat during the cooking operation. Such tantalizes the customers appetite and entices him to purchase the meat. Normally, in cafeterias the meat is cooked in a remote kitchen and subsequently moved to a display counter for sale. The display counter has to be provided with lights and heating elements for illuminating and keeping the meat warm while it is on display. Another problem encountered in cooking the meat in a remote kitchen is that, if the meat is not cooked to the desired degree of doneness throughout, it must be returned to the kitchen for further cooking.

In attempts to overcome the above problems cooking apparatus have been produced which incorporate infrared lamps supported on spaced supports. Meat is hung on a chain from the top of the cooking apparatus and rotated during the cooking operation by power operated mechanism positioned on top of the cooker. Such apparatus have neither been entirely satisfactory nor possess the advantages enumerated herein.

Accordingly, it is an important object of the present invention to provide a cooker which permits meat and the like to be cooked, displayed and served directly therefrom.

Another important object of the invention is to provide a display cooker which utilizes a meat carrier upon which meat may be positioned for cooking by simply placing it thereon without passing skewers therethrough or opening oven doors.

A further object of the present invention is to provide a display cooker with a meat carrier from which the meat can be carved.

Still another important object of the present invention is to provide a display cooker for meat and the like, wherein the meat is readily accessible without being removed from the cooker.

Another important object of the present invention is to provide a display cooker in which the rays from selected heating elements can be focused on desired areas of the meat so as to cook selected areas of the meat to desired degrees of doneness.

The construction designed to carry out the invention will be hereinafter described, together with other features thereof.

Figure 2:
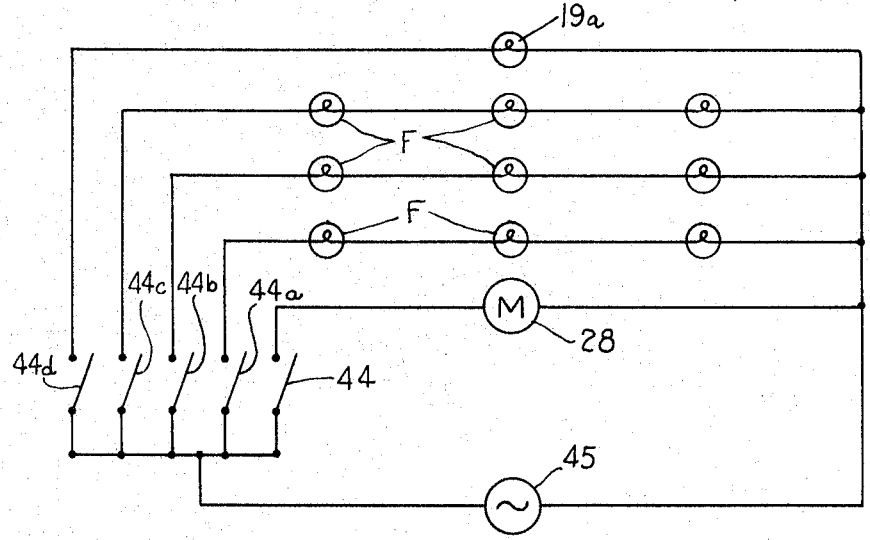
Figure 3:
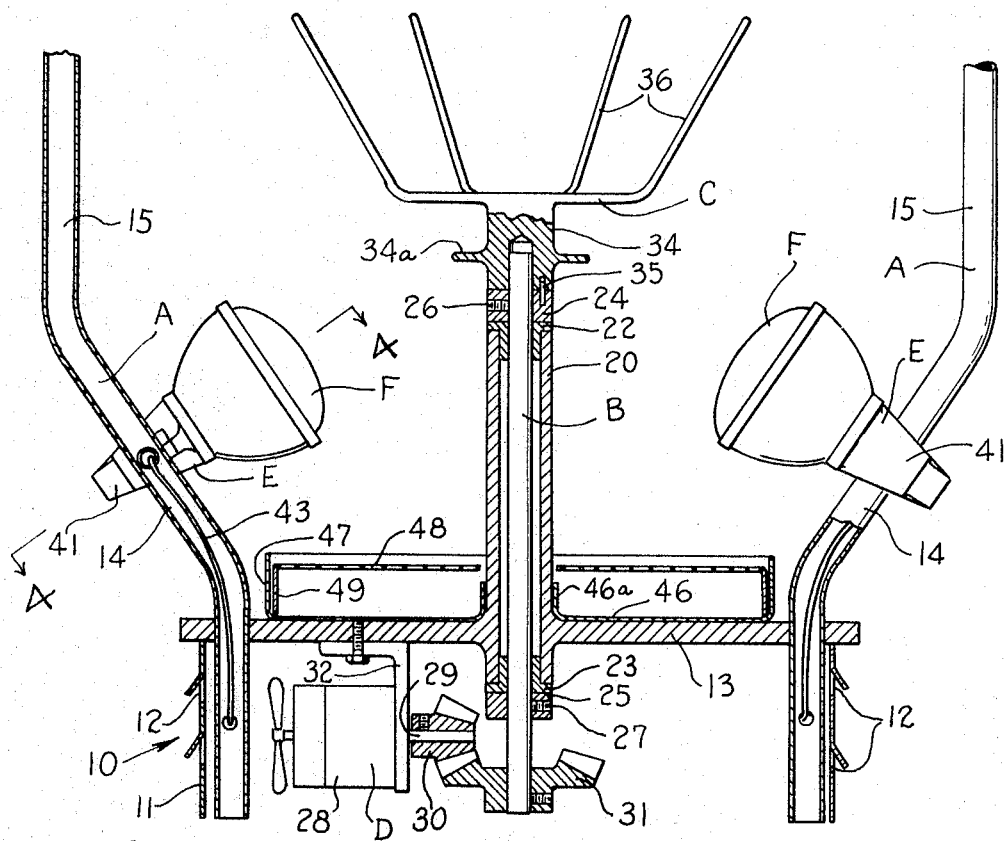
Figure 4:
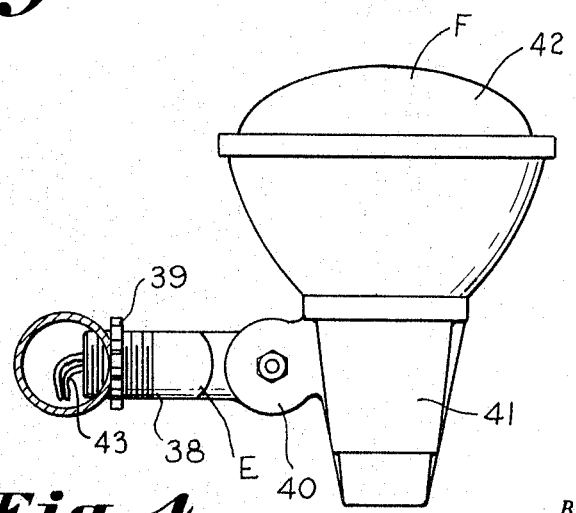

The invention will be more readily understood from a reading of the following specification and by reference to the accompanying drawings forming a part thereof, wherein an example of the invention is shown and wherein:

FIGURE 1 is a perspective view illustrating a display cooker constructed in accordance with the present invention, FIGURE 2 is a schematic diagram illustrating the electrical circuit for the device constructed in accordance with the present invention, FIGURE 3 is an enlarged partial transverse sectional elevation of the device illustrated in FIGURE 1, and FIGURE 4 is an elevation partially in section taken along line 4—4 in FIGURE 3 illustrating a pivotal heating lamp.

The drawings illustrate a display cooker provided for cooking, displaying and serving meat.. The cooker includes a base member with a plurality of circumferentially spaced vertical support members A carried thereon. A rotatable vertical shaft B extends upwardly from the base member intermediate the support members A. The vertical shaft B terminates within an intermediate portion of the support members. A meat carrier C open at its top is positioned on the vertical shaft B. The meat carrier C includes a base portion for receiving and encompassing a lower portion of the meat while permitting the meat to be accessible for cooking and carving. Power operated means D is provided for continuously rotating the shaft and the meat, while such is cooking within the spaced vertical supports. A plurality of pivotal mounting devices E are carried by the vertical support members. Infrared lamps F and the like are carried on each of the pivotal mounting devices for focusing the infrared rays from the lamps on desired areas of the meat so as to cook selected areas of said meat to desired degrees of doneness as the meat turns within the vertical support members. The vertical support members A are sufficiently spaced so that the intermediately disposed meat is accessible from all sides. The meat carrier C securely supports the meat intermediate the infrared lamps so that the meat is displayed while it is cooking and the entire upper portion of the meat can be carved with minimum obstruction from the vertical support members and the meat carrier.

Referring more particularly to the drawings, the numeral 10 generally designates a base member for the cooker. The base member 10 is formed of three aluminium side panels 11 which have their ends connected together producing a triangular shaped housing. The side panels are provided with vents 12 which permit air to pass therethrough. A base plate 13 is carried on top of the side panels defining an enclosure therebetween. The base plate 13 has three apertures therein for receiving the circumferentially spaced vertical support members A. The vertical support members A are constructed of tubular pipe, such as aluminium tubing. The lower ends of the support members are flush with bottom edge of the side panels 11 and aid in stabilizing the cooker.

Each of the vertical support members A has an outwardly and upwardly extending portion 14 which extends from the base plate to a vertical intermediate portion 15. The free-end of the intermediate portion 15 is integral with an upwardly and inwardly extending portion 16 which terminates in an inwardly extending horizontal portion 17. The lower side of the free-end of the horizontal portion 17 of each of the support members A is attached to a circular plate 18 by bolts or any other suitable means. An ornamental cylindrical translucent lamp 19 rests on the upper side of the horizontal portions 17 of the support members A, and is secured to the circular plate 18 by a bolt (not shown). The lamp 19 has an electric light bulb 19a therein for illuminating such for attracting attention to the cooker.

A vertical shaft B extends upwardly through a vertical column 20 which extends upwardly from a medial portion of the base plate 13 intermediate the support members A. The vertical shaft B is rotatably supported by a pair of bearings 22 and 23 located in an upper and lower end of the column 20, respectively. A pair of spaced collars 24 and 25 are attached to the rotatable shaft B adjacent the bearing 22 and 23 by setscrews 26 and 27, respectively, so as to prevent vertical movement of shaft B. Power operated means D is provided for continuously rotating the vertical shaft B. The power operated means D includes a suitable air cooled electrically driven motor 28 having a drive shaft 29 which is provided at its free end with a pinion gear 30 which meshes with a beveled gear 31 rigidly secured to the lower end of the vertical shaft B. The motor 28 is attached to the lower side of the base plate 13 by a metal bracket 32.

A meat carrier C, open at its top, is positioned on the vertical shaft B. The meat carrier B includes a base portion for receiving and encompassing a lower portion of a piece of meat 33, such as a roast, while permitting the meat to be accessible for cooking and carving. The meat carrier C is provided with a cylindrical base 34 having a cylindrical opening therein for receiving an upper end of rotatable shaft B. The cylindrical base 34 is fixed to the collar 24 by means of a pin 35 so that it will rotate with the collar 24 and shaft B. The cylindrical base has a circumferential flange 34a extending outwardly therefrom which prevents drippings from the meat being cooked from sliding down column 20.

A plurality of upwardly and outwardly extending spaced tines 36 are integral with an upper portion of the cylindrical base 34 of the meat carrier. The tines 36 encompass a lower portion of the meat being cooked supporting the meat so that when the cooking operation has taken place the meat can be carved and served directly therefrom. In order that various pieces of meat of different sizes and shapes can be cooked and served from the cooker, several meat carriers C generally accommodate the cooker. For example, in cooking a turkey, a meat carrier C would be utilized having tines which are not spread apart as far as the tines of a carrier used to support a roast. One important advantage of the meat carrier C is that the meat may be positioned for cooking by simply placing it thereon without passing skewers therethrough or opening oven doors. The meat merely rests within the basket-like tray formed by the tines permitting the meat to be centrally located and accessible relative to the cooking lamps F. In order to change the meat carrier C such is merely pulled directly upwards off of shaft B and pin 35 and a different carrier placed thereon.

A plurality of pivotal mounting devices E are carried by each of the vertical support members A. Infra-red lamps F and the like, are carried on each of the pivotal mounting devices for focusing the rays from the lamps on desired areas of the meat so as to cook selected areas of the meat to desired degrees of doneness as the meat turns within the vertical support members A. The pivotal mounting devices E each have a laterally extending member 38 threaded on one end so that the mounting device can be screwed into an aperture provided therefor on a support shaft A. A lock nut 39c carried by the threaded member 38 is drawn tightly against the vertical support member A to fix the pivotal mounting device E relative to the support member A. When the lock nut 39 is loosened, the mounting devices can be pivoted in a vertical direction so as to aid in focusing the infrared lamps F on a desired portion of the meat. In order that the lamps F can be pivoted from left to right, the mounting devices are provided with a pivot joint 40 which enables the base 41 of the lamps F to be pivoted relative to the laterally extending member 38. The base 41 of the lamp has a lamp socket (not shown) enclosed therein for accommodating an infrared lamp F. Electrical energy is supplied to the sockets and lamps F by means of wires 43, which are threaded through the laterally extending member 38 of the pivotal mounting devices E, into the vertical support members A. The wires 43 are threaded through the support members A and exit into the base of the housing. The wires 43 are electrically connected to a suitable power source by means of control switches 44a, 44b and 44c.

Each of the vertical support members A have three lamps F thereon. The lower lamps on each of the support members are connected in series with the control switch 44a. The intermediate lamps are connected in series with switch 44b, and the uppermost lamps F on the vertical support members A are connected in series with switch 44c. Thus, by selectively closing the switches 44a, 44b and 44c the lamps associated therewith may be energized to maintain the meat carried on carrier C warm, or to cook selected areas of the meat to desired degrees of doneness.

A schematic diagram for the electric circuitry is illustrated in FIGURE 2. The lamps F are grouped as mentioned above, and the groups as well as lamp 19a and motor 28, are connected in parallel relation with respect to each other and in series with a source of power 45. The motor 28 and lamp 19a are provided with control switches 44 and 44d, respectively.

A grease tray 46 is carried on the base plate 13 for catching the drippings from the meat 33 being cooked. The tray has a circular opening in its center with upwardly extending flanges 46a integral therewith, which fit flush against the column 20. The outer edges 47 of the tray are also flanged upwardly. A perforated grate 48 is carried in the tray. The grate 48 is supported off the bottom of the tray 45 by a downwardly extending flange 49 permitting grease to accumulate thereunder in the tray. Since the meat carrier C is provided with the circumferential flange 34a, grease from the cooking meat does not slide down column 20 and drops off the outer edge of the flange 34a into the tray 45. Such aids considerably in maintaining the cooker clean and in cleaning such after use, since substantially all of the drippings are collected in the tray.

It is evident from observing the cooker illustrated in FIGURE 1 that the vertical supports A are sufficiently spaced so that the meat being cooked is clearly visible. After the meat is cooked it can be carved and served directly from the meat carrier C. The lamps F on each of the vertical supports A operate independently to control the cooking time and desired doneness of the meat. For example, by switching part of the lights on, one section of the roast can be cooked well done, leaving other portions medium or rare, as desired. The base of the cooker is so designed that it can fit directly on top of a conventional counter.

While a preferred embodiment of the invention has been described using specific terms, such description is for illustrative purposes only, and it is to be understood that changes and variations may be made without departing from the spirit or scope of the following claims.

What is claimed is:

1. In a display cooker provided for cooking, displaying and serving meat including: a base member; a plurality of circumferentially spaced vertical support members carried on said base member; a rotatable vertical shaft extending upwardly from said base member, said rotatable vertical shaft being disposed intermediate said spaced support members and terminating within an intermediate portion of said spaced support members; a meat carrier open at its top positioned on said rotatable vertical shaft, said carrier including a base portion for receiving and encompassing a lower portion of said meat while permitting said meat to be accessible for cooking and for carving; power operated means driving said vertical shaft for continuously rotating said meat while cooking within said spaced vertical supports; a plurality of spaced pivotal mounting devices being carried by said vertical support members; an infrared lamp and the like being carried on each of said pivotal mounting devices for focusing infrared rays from said lamp on desired areas of said meat so as to cook selected areas of said meat to desired degrees of doneness as the meat turns within the vertical support members; said vertical support members being spaced so that the intermediately disposed meat is accessible from all sides; whereby said meat carrier securely supports meat simply placed thereon for rotation intermediate the infrared lamps so that the meat is displayed while it is cooking and meat of desired degrees of doneness can be carved and served from the meat carrier with minimum obstruction from the vertical support members and the meat carrier.

2. The apparatus as set forth in claim 1 wherein corresponding positioned lamps on said vertical support members are electrically connected in groups; each group having a switch associated therewith for controlling the energization of the lamps, whereby selective groups of said lamps can be energized by closing the associated switch so that heat can be selectively applied to different areas of said meat.

3. The apparatus as set forth in claim 1 wherein said meat carrier base portion includes, a base member, an outwardly extending flange integral with said base member preventing grease drippings from sliding down said vertical shaft, and said base portion including a plurality of upwardly and outwardly extending tines.

References Cited

UNITED STATES PATENTS

| | | | |
|---|---|---|---|
| 1,819,301 | 8/1931 | Noble | 99—421 X |
| 2,049,481 | 8/1936 | Walterspiel | 99—421 |
| 2,517,360 | 8/1950 | Singer | 99—341 X |
| 2,581,570 | 1/1952 | Amantides | 99—421 |
| 2,687,080 | 8/1954 | Dorin | 99—421 X |
| 3,026,400 | 3/1962 | Van Sciver | 99—419 |
| 3,221,683 | 12/1965 | Wickenberg | 99—393 X |
| 3,227,065 | 1/1966 | Litman | 99—341 |

FOREIGN PATENTS

| | | |
|---|---|---|
| 1,100,152 | 3/1955 | France. |
| 265,848 | 7/1929 | Italy. |
| 646,109 | 9/1962 | Italy. |

BILLY J. WILHITE, *Primary Examiner.*